United States Patent [19]

Matturo et al.

[11] Patent Number: 5,210,059
[45] Date of Patent: May 11, 1993

[54] MULTILAYERED CATALYST FOR CONTROLLED TRANSPORT OF REACTANT

[75] Inventors: Michael G. Matturo, Lambertville; Harry W. Deckman, Clinton; James A. McHenry, Washington; Robert P. Reynolds, Jr., Clinton, all of N.J.

[73] Assignee: Exxon Research & Engineering Company, Florham Park, N.J.

[21] Appl. No.: 775,657

[22] Filed: Oct. 10, 1991

[51] Int. Cl.$^5$ .............................................. B01J 35/02
[52] U.S. Cl. ......................................... 502/4; 502/159
[58] Field of Search ................................... 502/4, 159

[56] References Cited

U.S. PATENT DOCUMENTS 4,132,668  1/1979  Gryaznov et al. ..................... 502/4

FOREIGN PATENT DOCUMENTS 228885  7/1987  European Pat. Off. ................ 502/4

Primary Examiner—Patrick P. Garvin
Attorney, Agent, or Firm—Ronald D. Hantman

[57] ABSTRACT

The present invention is a multilayered catalyst structure coated onto the surface of a membrane which does not have physical micropores. The non-microporous membrane serves as a mechanical support for the thin multilayered catalyst structure and also can be used to control the rate at which some reactants arrive at (or some products leave from) the multilayered catalyst structure.

A multilayered catalyst structure is coated on the non-microporous membrane which is composed of at least a catalyst layer and a separate transport layer.

7 Claims, 5 Drawing Sheets

Non-poisoning of cyclohexene Hydrogenation Over PE/Pt/Silica

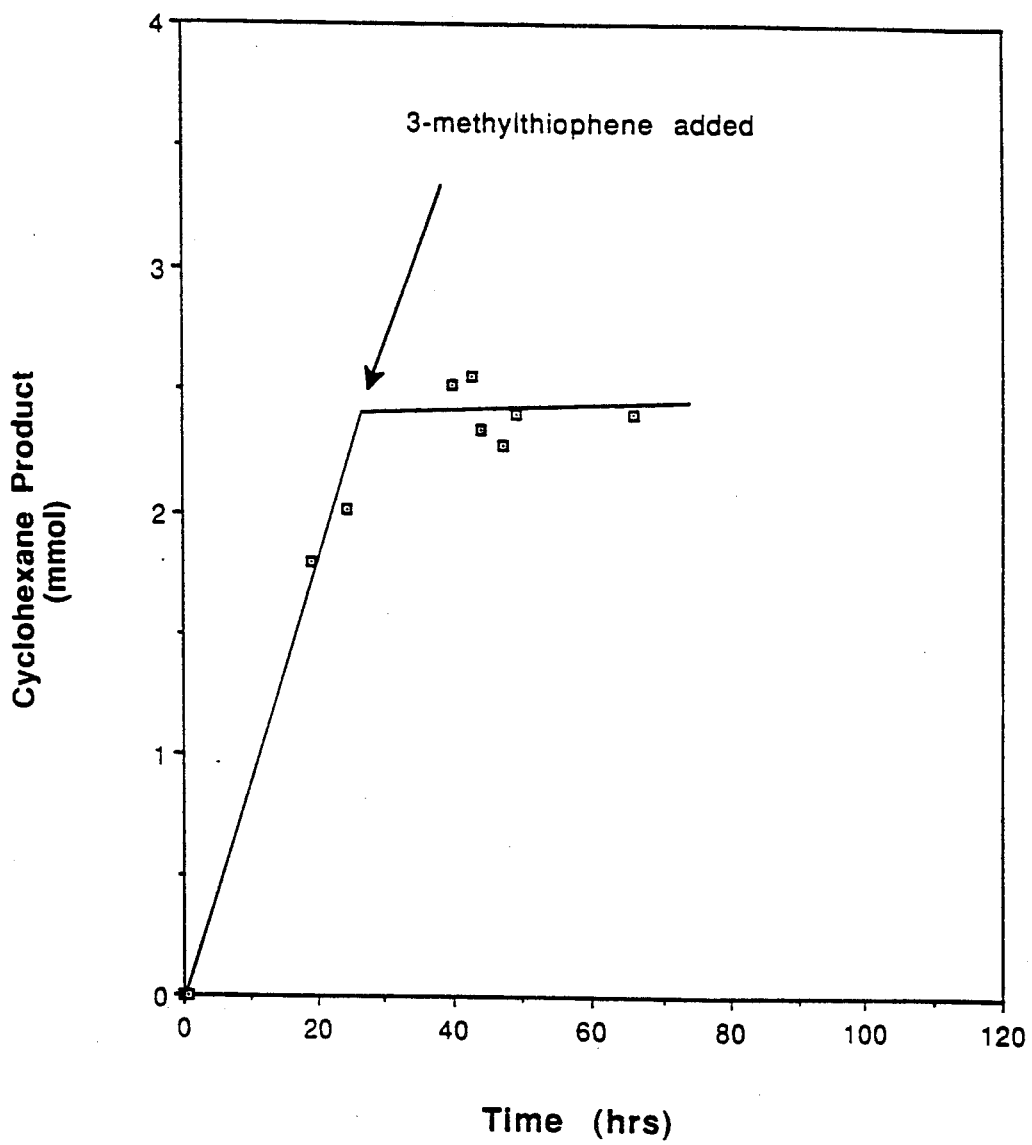

MULTILAYERED CATALYST FOR CONTROLLED TRANSPORT OF REACTANT

BACKGROUND

The present invention relates to a catalyst. In particular, it relates to a catalyst structure having multiple layers.

All known catalytic membrane reactor configurations fall into one of four topological classifications. The first class we refer to as permaselective wall membrane reactors, which use a semipermeable membrane to transport a product or reactant while confining a bulk or homogeneous catalyst behind the membrane. The second class we refer to as tea-bag reactors which have a catalyst sandwiched between two membranes. The third class we refer to as membrane confined catalytic reactors which have a catalyst in the membrane interior. Reactions are catalyzed and products are formed as reactants flow through the interior of the membrane. The fourth class we refer to as surface catalyzed membrane reactors which have a catalytic layer attached to the surface of the membrane to induce reactions that form products at the exterior surface of the coated membrane.

The present invention deals with a new type of surface catalyzed membrane. The new type of surface catalyzed membrane contains a multilayered catalyst structure on the surface of a permeable membrane which does not have physical micropores. This multilayer catalyst structure on a non-microporous permeable membrane has several functional advantages which have not been realized in previous surface catalyzed membranes. The advantages arise primarily because of the multilayered catalyst structure contained in the membrane. The multilayered catalyst structure spatially separates catalytically important functions such as bond activation, transport and product formation. This type of multilayer surface catalyzed membrane structure has not been disclosed in the past. Surface catalyzed membrane structures which have been studied in the past contain a single layer of catalytic material. Often, the single layer catalyst is coated onto a foreign membrane material which can be either microporous or non-microporous. Other single layer surface catalyzed membrane structures which have been studied are formed entirely from one material which acts as both the membrane and catalyst. An example of a non-microporous single layer catalytic membrane formed entirely from one material would be a palladium foil.

Single layer surface catalyzed membranes formed with non-microporous membranes have been primarily used for hydrogenation and dehydrogenation reactions. Some of the earliest suggestions for reactors employing single layer surface catalyzed membranes come from a group in Russia (E. A. Zelyaeva, V. M. Gryaznov, Izv. Vyssh. Uchebn. Zaved., Khim. Tekhnol., 22(6), 684–7 (1979)) which studied the use of pure metal films (usually Pd foils) in hydrogenation and dehydrogenation reactions. The metal film diffusively transported hydrogen through its crystal lattice either away from (dehydrogenation) or to (hydrogenation) the side where reactions with hydrocarbon molecules occurred. Reaction rates described (V. M. Zhernosek, N. Mikhalenko, E. V. Khrapova, V. M. Gryaznov, Kinet. Katal. 29(4) (1979)) are quire low due to the limited permeability of the thick (20–1,000 micron) films employed to transport hydrogen. These surface catalyzed membranes derived some mechanistic advantages from the spatial separation of the catalytically important functions of bond activation and activated species transport. Hydrogen is activated on one side of the membrane and transported through the membrane. This can dramatically change the availability of hydrogen on the catalyst surface. In a conventional catalytic system where hydrogen, reactant and product all compete for the same surface, the hydrogen availability is determined by the competitive isotherm of the species present. Although these types of single layer catalytic membranes can gain some mechanistic advantages from the spatial separation of catalytically important functions, different and more important mechanistic advantages can be obtained using the type of multilayer surface catalyzed membrane described herein. In particular, it will be shown that multilayered catalytic membranes formed on nonmicroporous supports can obtain a degree of poison tolerance not achieved with the previously described single layer catalytic membranes.

SUMMARY OF THE INVENTION

The present invention is a multilayered surface catalyzed membrane for reacting a reactant and a feed material to form a product. The membrane includes a semipermeable non-microporous support membrane which transports a reactant incident from one side of the support membrane, a thin-film first catalytic activating material adjacent to the nonmicroporous support membrane on the side away from the incident reactant, wherein the feed material is incident on said catalyst membrane from the side opposite the reactant, and a protective transport overlayer adjacent the first catalytic activating material.

In another embodiment of the invention, the membrane also includes a thin-film of a second catalytic activating material adjacent to said support member on the side opposite said first catalytic activating material.

The product formed in the reaction between the reactant and feed material is formed substantially adjacent to the outer surface of the protective layer.

BRIEF DESCRIPTION OF THE DRAWINGS

FIG. 5 shows the same conversion shown in FIG. 4, but without the silica overlayer.

DESCRIPTION OF PREFERRED EMBODIMENT

Figure 1:
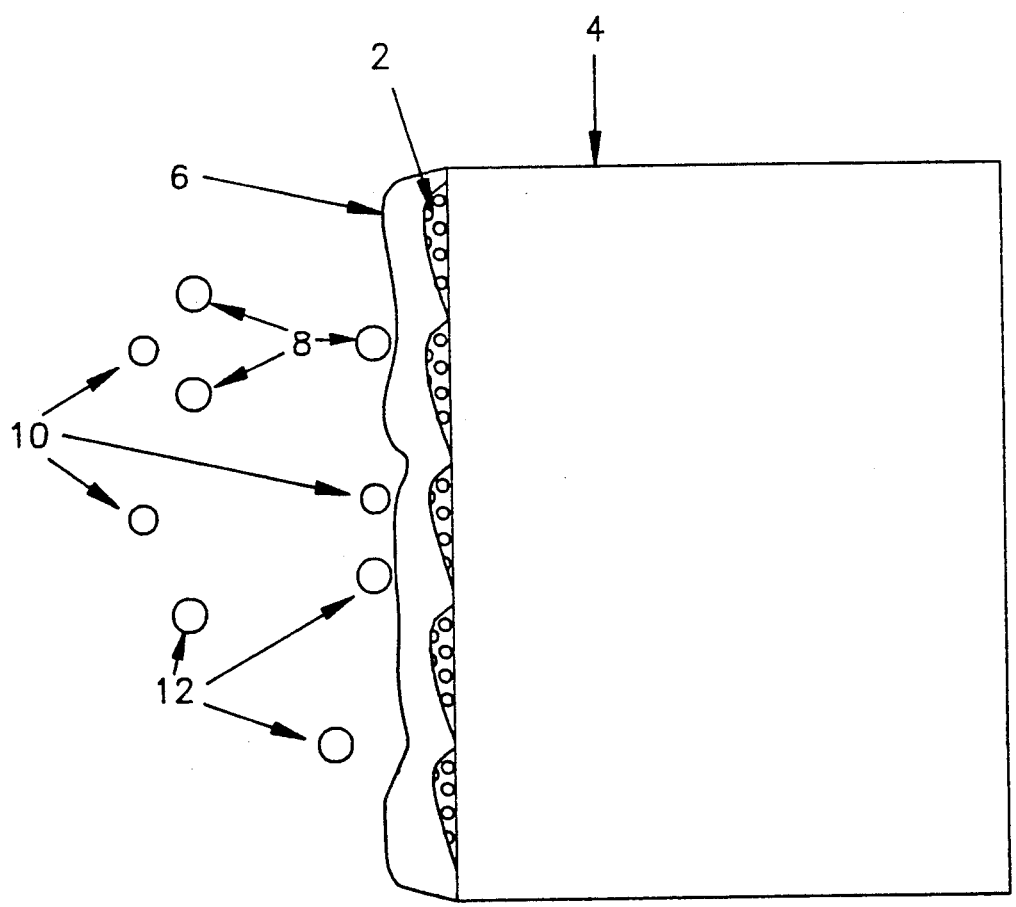
FIG. 1 shows a schematic diagram of a single sided conventional layered catalyst structure. Also shown in the schematic diagram are product and reactant molecules which can approach the catalyst surface from only one side. Supported heterogeneous layered catalysts have this type of topological structure.

It is an object of the present invention to obtain significant mechanistic advantages from using a multilayered catalyst structure coated onto the surface of a membrane which does not have physical micropores. The non-microporous membrane serves as a mechanical support for the thin multilayered catalyst structure and also can be used to control the rate at which some reactants arrive at (or some products leave from) the multilayered catalyst structure. Precise metering of reactants or products can be achieved because they diffuse rather than hydrodynamically flow through the membrane. Diffusion rates through the membrane are controlled by concentration gradients across the non-porous membrane, as well as thickness and permeability of the non-microporous membrane material.

The non-microporous membrane is composed of a material through which either a reactant or product is diffusively transported. Microporous materials are taken to be those containing physical pores greater than 10 Å, and there tends to be a convective or hydrodynamic component to the flow of small molecules through the micropores. Some types of hydrodynamic flow through microporous membrane materials are: (1) Knudson flow and (2) surface flow over the microporous network. These types of convective or hydrodynamic flow components tend to make the permeability of microporous materials considerably larger than non-microporous materials. It is an object of the present invention to use non-microporous membrane materials to support the multilayered catalyst structure. The non-microporous membrane material provides structural integrity, allowing the catalyst and transport layers to be thin films. By forming these layers as thin films, catalytic activity can be maximized. Moreover, permeability of the non-microporous membrane support can be tuned to match the reaction rate at the catalyst. Permeability of the nonmicroporous membrane can be controlled by altering the membrane thickness and composition. Typically the non-microporous membrane is a dense polymer film. In a preferred embodiment it is a sheet of polyimide less than 50 microns thick. In a more preferred embodiment it is a sheet of polyimide less than 10 microns thick. Other polymer films can also be used as non-microporous membranes and some examples include polyethylene, mylar, and polypropylene.

The multilayered catalyst structure coated on the non-microporous membrane is composed of at least a catalyst layer and a separate transport layer. The catalyst may be a thin layer or a group of modules (see FIG. 2). However, for convenience the catalyst shall be referred to as a layer although it shall mean both. The catalyst layer is capable of activating at least one of the species in the reaction and the transport layer is capable of moving the activated species away from or to the exterior surface where products are formed by chemical reactions. Choice of the catalyst is dictated by the type of reaction chemistry desired. The reaction chemistry must involve at least one small molecule which can diffuse through the non-microporous membrane to or away from the catalyst layer. Small molecular species usable include hydrogen, oxygen and other molecular species with sizes significantly less than 10 Å. Reaction chemistries which can be performed with these small molecular species include hydrogenation, dehydrogenation, oxidative coupling and oxidation. Some of the catalysts which can be used to activate these small molecular species include noble metals, transition metal sulfides, and oxides.

The transport layer must be capable of moving the molecular species activated by the catalyst to the exposed surface where reaction with other molecular species occurs. Materials usable as transport layers may in some cases also act as catalysts, however, the basic bond activation of the small molecular species is performed by the catalyst layer. Often the transport layer is composed of a material which would be considered non-catalytic. The transport layer is formed as a thin film over the catalyst and to maximize the surface arrival rate of activated species, it is preferred that the thickness of the transport layer be less than 5 microns. In a more preferred embodiment, the thickness of the transport layer is less than 0.1 microns. Materials used for the transport layer must be matched to the species activated by the catalyst. For example, when the catalyst layer activates hydrogen, materials which can be used as substochiometric silica, palladium, tungsten oxide and molybdenum oxides. A further requirement of the multilayered catalyst structure is that the interfaces in it be stable under reaction conditions. The interface between either the membrane and catalyst or catalyst and transport layer can debond under reaction conditions. An example of an unstable catalyst structure is a palladium catalyst layer and silicon oxide transport layer run in a hydrogenation reaction. Under reaction conditions, an adhesion failure occurs between the silicon oxide and palladium layers.

The surface catalyzed membrane geometry spatially separates some of the reactants and products. In some cases reactants approach from opposite sides of the membrane and in other cases, products exit through opposite sides. This is not the case with conventional heterogeneous catalysis where reactants and products approach and leave from the same side of the catalyst. We refer to the topological arrangement of conventional heterogeneous catalysts in which reactants and products are introduced from the leave through the half space adjacent to the local catalyst surface as a single sided geometry. We refer to membrane geometries in which some of the products and reactants exit and leave through opposite faces as two-sided geometries.

The following discussion will further illustrate differences between layered catalysts formed on conventional supports (single sided geometry) and those formed on the types of permeable membranes disclosed herein (two sided geometry). Two sided delivery of reactants in a surface catalyzed membrane allows a simple means of matching the rate of delivery of activated species with the rate at which the activated species is consumed by reaction at the layered catalyst surface. This tuning of delivery and reaction rate efficiently utilizes the reactants. Independent tuning of the rate of reactant delivery to match the rate of reaction cannot be achieved in single-sided bulk catalyst structures and can only be achieved with a membrane architecture. Other advantages of the surface catalyzed membrane reactor architecture derive from the fact that the functions of mechanical support, catalytic activation and transport are spatially separated. In particular, this functional separation can impart an unusual degree of poison resistance in some layered catalyst structures used in membrane geometries.

The present invention can be used with several different layered catalyst structures all of which contain at least one catalytic layer and another layer which transports an activated species formed by the catalyst. For the purposes of description, it will, however, be illustrated with a layered catalyst containing only two layers. Specifically, the layered catalyst structure considered comprises a catalytic activation layer and a transporting layer. Construction and operation of single and two sided, two layered catalyst structures will first be discussed. Then, mechanistic advantages derived from using the two layer catalyst in a surface catalyzed membrane (two sided geometry) rather than in a single sided geometry will be described.

Figure 2:
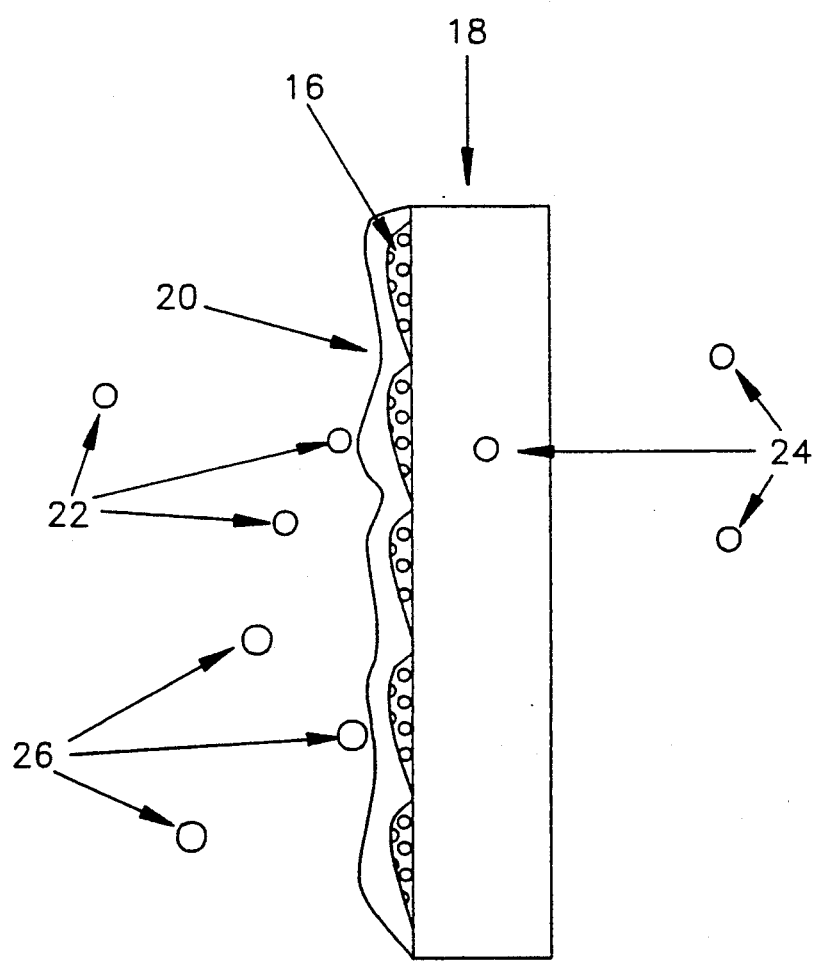
FIG. 2 shows a schematic diagram of a surface catalyzed membrane containing a layered catalyst structure. Also shown in the diagram are different reactant and product molecules. Because some of the reactants are diffused through a non-microporous membrane, reactant molecules approach the catalyst structure from two different directions. The two sided geometry offers significant mechanistic advantages over the single sided geometry shown in FIG. 1.

Construction and operation of two layer catalyst structures on conventional supports (single sided geometry) and in a membrane (double sided geometry) is shown in FIGS. 1 and 2, respectively. FIG. 1 shows a single sided layered catalyst structure which contains an impermeable support 4 coated with a thin catalyst layer 2 which can be either a continuous or discontinuous film. A layered catalyst is produced by overcoating the catalyst layer 2 with a layer 6 that transports one or more reactants from the exterior surface to the catalyst 2. The transport layer 6 must also deliver species activated on the catalyst back to the exterior surface where they participate in reactions. Because the support is impermeable, reactants (8 and 10) approach and products 12 leave the singled-sided layered catalyst structure (2, and 4, on 6) from the half plane above the local) catalyst surface. This half plane may be part of a pore structure inside a pellet or a region adjacent to the edge of a particle. An example of the type of single sided catalyst structure shown in FIG. 1 has been disclosed by (A. B. McEwen, F. A. Etzkorn, W. F. Maier, Chimia (09) (1987)). The impermeable support (4) was a silicon wafer (>100 microns thick). The catalyst layer (2) was composed of submicron thick Pt film and the transport layer was composed of a silicon oxide film. The catalyst structure was used (A. B. McEwen, W. F. Maier, R. H. Fleming, S. M. Baumann, Nature 329 531–4 (1987)) for hydrogenation chemistry. Hydrogen had to permeate through the silicon oxide film to the underlying Pt layer where it was activated. The diffusion of hydrogen through the silicon oxide film is a slow process and the rate of catalytic reaction was severely limited by the diffusional rate. To overcome limitations of single sided catalyst structures, we have created the type of surface catalyzed membrane structure shown in FIG. 2. FIG. 2 shows a two layer catalyst structure (16 and 20) used in a membrane configuration. The surface catalyzed membrane is produced by coating a catalyst 16 on a semipermeable, non-microporous membrane 18 and then overcoating it with a transport layer 20. The catalyst 16 can be either a continuous or discontinuous layer. When the catalyst is formed from a continuous layer, it must transport an activated reactant through its interior. When the catalyst layer 16 is discontinuous, it can transport an activated reactant along its surface or through its interior. The semipermeable membrane 18 transports at least one of the reactants 24 to the catalyst 16. The reactant 24 is activated by the catalyst layer 16 and transported as an activated species to the surface where it combines with at least one other reactant 22 to form a product 26 which leaves through the half space above the transport layer 20. Species activated by the catalyst (24) are transported through the transport layer 20 covering the catalyst. In the single sided geometry, the transport layer 6 must not only transport the activated species, but it must also transport at least one of the reactants from the surface to the catalyst layer 2. The less demanding transport requirements in the membrane configuration lead to a more rapid delivery of activated species to the catalyst surface and a higher reaction rate.

The present invention will be further illustrated with a surface catalyzed membrane designed for hydrogenation/dehydrogenation reactions. A two layer catalyst structure is employed to transport hydrogen away from the site where it is activated to site of reaction at the exterior surface. The activated hydrogen species is not necessarily molecular and is defined as the species formed by the catalyst. The transport of activated hydrogen away from the catalyst surface to a remote reaction site is referred to as hydrogen spillover. Numerous examples of this type of transport phenomena have been documented (J. H. Sinfelt, P. J. Lucchesi, J. Am. Chem. Soc 85 3365-7 (1963).7) and M. Boudart, M. A. Vannice, J. E. Benson, Z. fur Physika. Chemie Neue Folge, Bd. 64 171-77 (1969)) in hydrogen spillover studies for single sided heterogeneous catalysts. These examples involve 2-dimensional spillover of hydrogen along surfaces in a variety of metal/support systems and evidence for surface transport comes from (W. C. Connor, Jr., G. M. Pajnok, and S. J. Techner, "Spillover Of Sorbed Species" in *Advances in Catalysis* 34, 1, 1986 Academic Press) measurements of molecular hydrogen adsorption, direct measurement of surface diffusion by IR spectroscopy, hydrogenation reactivity studies with unsaturated molecules and isotopic exchange measurements. Hydrogen spillover has not, however, been previously used to generate useful surface catalyzed membrane reactors.

To utilize hydrogen spillover, the two layer surface catalyzed membrane structure shown in FIG. 2 must be constructed from the proper materials. To obtain a surface catalyzed membrane that takes advantage of hydrogen spillover, the two layer catalyst structure (16 and 20 must contain a catalyst layer made from a material that activates hydrogen which is overcoated with a protective layer made from a material that transports activated hydrogen. The hydrogen activating layer can be made from any catalytic material capable of activating molecular hydrogen. Some of the catalytic materials which can be used for this layer include Pt and Ni. Preferably the catalytic hydrogen activating layer is formed as a thin film less than 10,000 Å thick and more preferably the layer is less than 1,000 Å thick. When the catalytic material chosen is impermeable to hydrogen, the catalytic film cannot be continuous and must be divided into some type of island structure. In particular bulk platinum is impermeable to hydrogen and must be incorporated as some type of island structure. Usually this can be done by coating it as a film with thickness less than 500 Å. In this ultra-thin film limit, Pt tends to coat as islands rather than a continuous film even on flat smooth supports. On non-microporous membrane supports, techniques which can be used to deposit the preferred thin films of catalytic materials include solution precipitation, sputtering, thermal and electron beam evaporation. Films of these materials as thin as 5 Å can be used because of the non-porous nature of the membrane support. In this ultra-thin limit, catalysts tend to cluster into islands rather than form continuous layers.

A thin film transport layer must be coated so that it covers the catalytic layer. The lack of physical holes in the non-microporous membrane support forms facilitates the growth of very thin transport layers covering the catalyst. This reduction in thickness required to overcoat the catalyst layer comes from the physical morphology of the catalyst layer that must be covered. This transport layer must deliver the catalytically activated hydrogen to the membrane surface where it participates in reactions. By reducing its thickness, the rate at which activated species migrate to the surface can be increased. The transport layer can also protect the catalyst from coming into contact with all reactants other than molecular hydrogen. When it acts as a protective layer it can prevent long-term deactivation of the catalytic hydrogen activating layer by poisons such as sulfur, nitrogen, and metal containing mixtures. Materials which can be used for the transport layer include materials such as palladium, silver-palladium alloys, tungsten trioxide, oxides of silicon and oxides of germanium. All of these materials have compositions which transport activated hydrogen. The material most preferred for a transport layer is a less than 500 Å thick film of substoichiometric silica. Usually this material is produced by electron beam evaporation of silica (silicon dioxide). If the silica is evaporated in the absence of oxygen, it losses a small amount of oxygen and compositions such as $SiO_{1.8}$ are found in the deposited film.

The two sided geometry of the surface catalyzed membrane eliminates problems with molecular hydrogen transport encountered in the previous attempts to produce catalysts based on hydrogen spillover. The two-sided geometry incorporates a mechanically strong, highly permeable membrane support which delivers molecular hydrogen to the layered catalyst structure capable of splitting molecular hydrogen. The high permeability support layer coupled to the activating thin film (20–1,000Å) overcomes the rate limitations of the single-sided layered catalysts previously described.

Figure 3:
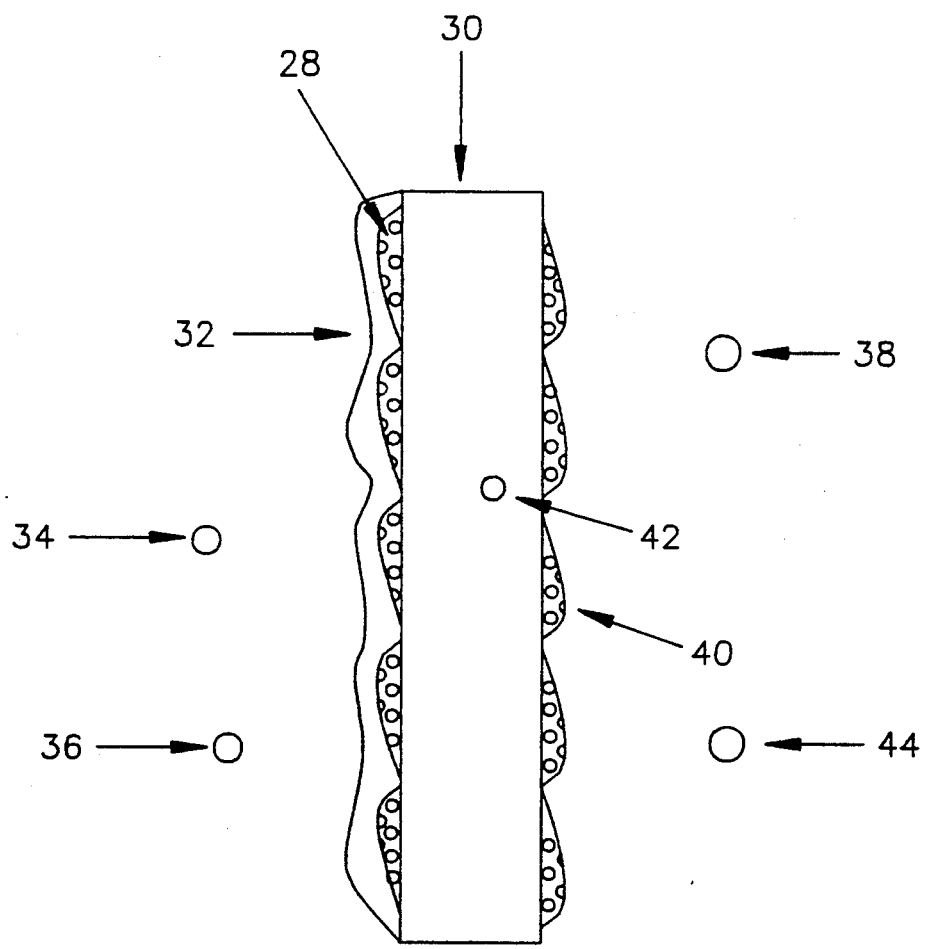
FIG. 3 shows a schematic diagram of a surface catalyzed membrane containing a layered catalyst structure on one side and a single catalyst layer on the other. Also shown are reactant and product molecules involved in dehydrogenation and hydrogenation reactions run on opposite sides of the membrane. Hydrogen formed in dehydrogenation reaction is consumed in the hydrogenation reaction after it diffuses through the membrane.

Several other variations of surface catalyzed membranes containing layered catalyst structures can be envisioned. A straightforward extension would be to back the non-microporous membrane with an extra microporous membrane support. In some cases this would add extra strength to the membrane and aid in module fabrication. The basic invention of a layered catalyst structure in contact with a non-microporous membrane material would still be contained in the ultimate structure. Another variation of our basic concept involves adding an extra catalytic layer on the opposite side of the membrane to which the layered catalyst is attached. This would allow catalytic reactions to proceed on both sides of the surface catalyzed membrane. A particular embodiment would run a dehydrogenation reaction on one side of the membrane and use the hydrogen evolved in a hydrogenation reaction run on the opposite side of the membrane. This membrane uses a chemical source-sink approach to pump hydrogen from one solution to another without introducing hydrogen gas. A structure, illustrating the chemical source-sink concept is shown in FIG. 3. A catalyst layer 40 causes a molecular species 38 to undergo a dehydrogenation reaction on one side of the membrane forming a dehydrogenation reaction on one side of the membrane forming a dehydrogenation reaction on one side of the membrane forming a dehydrogenated product 44 and releasing hydrogen 42, undergoes a dehydrogenation reaction on one side of the membrane. The hydrogen can diffuse through a permaselective membrane 30 to a layered catalyst stricture on the opposite face. The layered catalyst structure is comprised of a catalyst layer 28 and a transport layer 32. The hydrogen is activated by the catalyst 28 and the transport layer 32 moves it in an activated form to the exposed surface where it reacts with a feed molecule 34 to form a hydrogenated product 36.

From the foregoing description it will be apparent that a new type of surface catalyzed membrane reactor containing a layered catalyst has been developed. Variations and modifications in the herein described structure will undoubtedly suggest themselves to those skilled in the art. Accordingly, the foregoing description should be taken as illustrative and not in a limiting sense. To further illustrate the architecture, we present the following examples.

EXAMPLE 1

A poison tolerant surface catalyzed hydrogen spillover membrane containing a layered catalyst structure was constructed and tested. The membrane contained a two layer catalyst structure comprised of an approximately 150 Å thick layer of Pt overcoated with an approximately 200 Å thick layer of substoichiometric silica. A 12 micron thick sheet of polyethylene was used as a mechanically strong, non-microporous, highly permeable support for the layered catalyst structure. The Pt was first sputter deposited onto the polyethylene sheet using a DC-magnetron sputtering technique. In DC-magnetron sputtering, an Argon plasma formed by applying a voltage between a Pt sputtering target and an anode is magnetically confined near the sputtering target. This confinement minimizes heating and degradation of the polyethylene film from bombardment by energetic ionic and neutral species in the plasma. To further minimize ion bombardment effects, a 12 volt bias voltage was applied between the sample holder containing the polyethylene film and the sputtering target. Sputtering conditions chosen deposited the Pt at 5 Å per second, yielding a discontinuous Pt island film. After the approximate 150 Å thick Pt film was deposited, a silica layer was added by electron beam evaporation. Electron beam evaporation is a physical vapor deposition technique which uses an electron beam to heat and vaporize the material being deposited. Care must be taken not to thermally melt the membrane during these depositions. Thermal heating was reduced by attaching the polyethylene to a more massive metal block, baffling optical radiation emitted in the electron beam deposition source and by controlling deposition rates.

To use the surface catalyzed membrane in a hydrogenation reaction, the polyethylene sheet coated with the layered catalyst was mounted into a 47 mm diameter steel cell made by Millipore Corporation. The 47 mm diameter Millipore cell is normally used to hold filters. Layers of porous teflon were placed on each side of the surface catalyzed membrane structure to cushion the membrane. An electroformed steel mesh which spanned the diameter of the cell was inserted on one side of the membrane to provide additional mechanical support. Holes (~250 micron diameter) in the mesh provided easy flow of reactants and products to and away from the membrane surface. A viton o-ring was used to seal the surface catalyzed membrane in the cell. One side of the membrane was pressurized with hydrogen gas at 1-5 atm.

Figure 4:
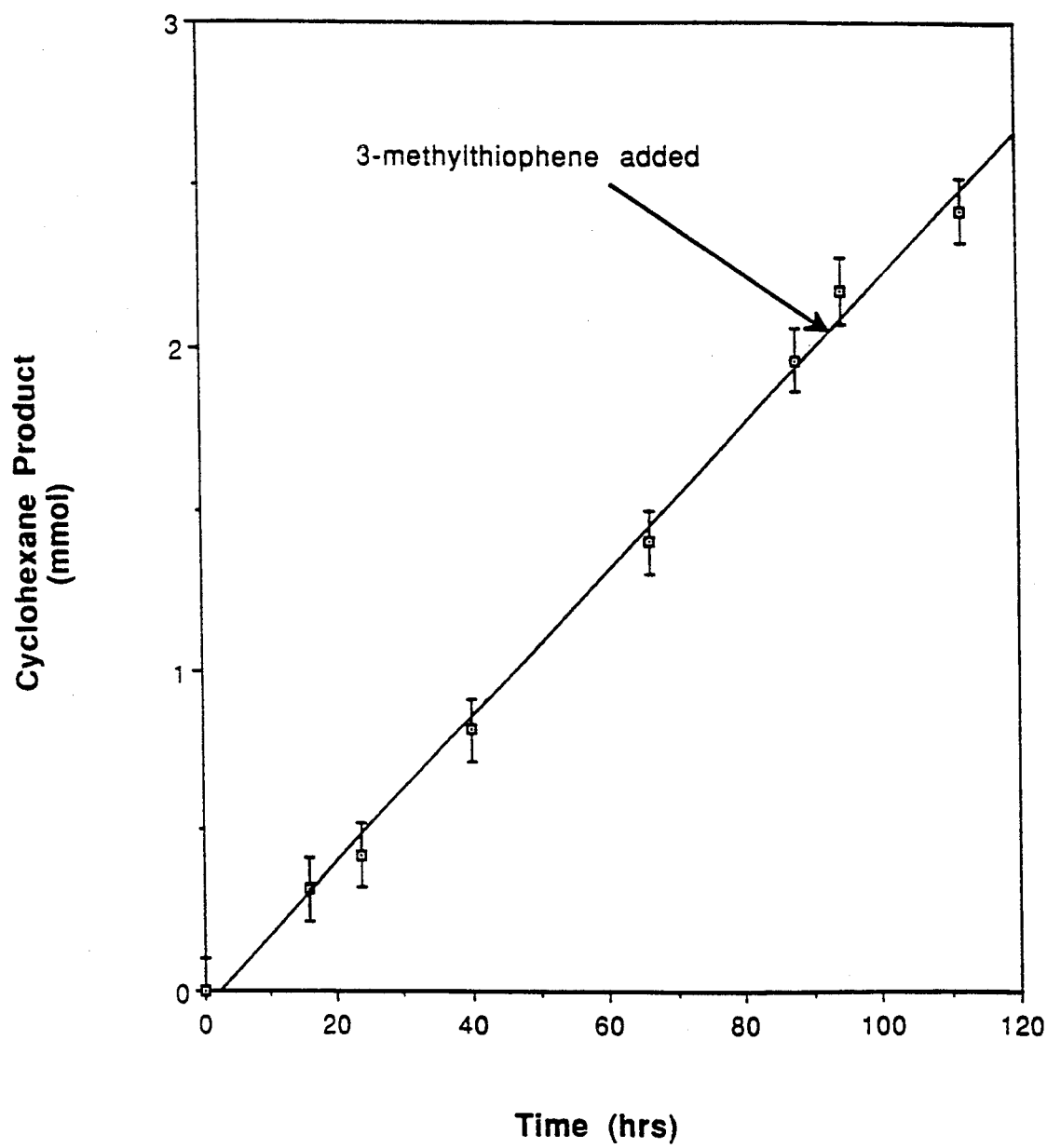
FIG. 4 shows the conversion of cyclohexene to cyclohexane using a membrane according to the present invention having a silica overlayer.

To test the above described membrane and demonstrate its poison tolerance, the hydrogenation of cyclohexene to cyclohexane was used as a probe reaction. Poisoning of the hydrogenation reactions usually occurs when heteroatom containing species, such as, thiophenes, pyridines, or even alcohols are added to the reaction mixture. The poisoning is apparently caused by competitive adsorption of these polar molecules on the metal catalyst surface. The layered catalyst structure in the surface catalyzed membrane can eliminate this problem and provide a degree of poison resistance. The substoichiometric silica transport layer separates the site of hydrogen activation from the site of hydrogenation eliminating competitive adsorption on the catalyst surface. In all tests of poison tolerance, a room temperature solution of cyclohexene (neat or in a solvent) was placed in contact with the layered catalyst. Hydrogen gas was supplied to the opposite side of the membrane at pressures of 50-500 Kpa. The pressure controlled the rate of delivery of hydrogen to the catalyst. FIG. 4 shows a plot of percent conversion of cyclohexene to cyclohexane vs. time (minutes) for a membrane operated at room temperature with a 300 Kpa hydrogen pressure across the membrane. The slope at any point on the plot is proportional to the instantaneous reaction rate. In the test (FIG. 4), 10 ml of a 0.88M solution of cyclohexene was used. After establishing a base reaction rate, 3-methylthiophene was added as a poison to the reaction. Approximately 1 ml of 3-methylthiophene was added to the mixture as a poison. This would normally be enough to poison $10^8$ times the amount of Pt present in the reactor. The point at which the poison was added is shown in FIG. 4. It is seen that approximately 24 hours after the addition of 3-methylthiophene, no inhibition of the reaction rate has occurred. This is a direct demonstration of the poison tolerance of the multilayered surface catalyzed membrane. At longer times, however, the reaction was observed to slow and eventually stop. This is attributed to the slow migration of the poison into the polymer support through small pinholes in the layered catalyst.

As a control experiment, an identical hydrogenation was conducted using a membrane without the silica overlayer (Pt/polyethylene only). The results are shown in FIG. 5. In this case, immediate poisoning of the reaction occurred as would be expected. The 3-methylthiophene is such a good poison at room temperature that it can actually be used to titrate the exposed Pt in the probe reaction.

In both the control and layered membranes, warming the reaction solution showed evidence for the slow hydrogenation of 3-methylthiophene. The major product appeared to be a methylbutene.

Auger spectroscopy of 3-methylthiophene poisoned membranes indicated that sulfur was present on surfaces of the silica coated membranes. No evidence, however, was observed in depth profile experiments for presence of sulfur at the interface between the silica and the Pt layer. A small percentage (<5%) of exposed Pt was observed on the silica coated membrane without any depth profiling and is most likely due to pin holes in the overlayer. Such exposed Pt cannot be responsible for any appreciable fraction of the hydrogenation activity in view of the observed poisoning resistance to 3-methylthiophene.

EXAMPLE 2

Performance of different transport layers was investigated by comparing initial rates obtained from cyclohexene hydrogenation reaction described in Example 1. A number of membranes containing a platinum metal hydrogen activating layer were examined with and without transport layers made from silica and germania. In all cases the platinum layer was formed by sputter deposition as a discontinuous island film with thickness near ~200 Å. The overlayers were always near ~350 Å thick and were prepared by either electron beam evaporation of either silica of germania. Electron beam evaporation of these materials tends to result in a substoichiometric film composition.

To compare the performance of different transport layers, initial rates for cyclohexene hydrogenation were measured at different olefin concentrations. Some of these data are summarized in the table below:

| Membrane | Initial Olefin Concentration (moles/liter) | Initial Rate $K \times 10^{-7}$ (mol/hr-cm$^2$) |
|---|---|---|
| Polyethylene/Pt | 0.85 | 42 |
| Polyethylene/Pt | 0.88 | 20 |
| Polyethylene/Pt/SiO$_2$ | 0.88 | 13 |
| Polyethylene/Pt | 7.9 | 60 |
| Polyethylene/Pt | 9.9 | 100 |
| Polyethylene/Pt/GeO$_2$ | 9.9 | 60 |

The data shown in the previous table refer to reaction run in the 47 mm diameter Millipore cell described in Example 1. The ratio of membrane hydrogenation rates (Table 1) for Polyethylene/Pt Polyethylene/Pt/SiO$_x$ (0.88M) and Polyethylene/Pt Polyethylene/Pt/GeO$_x$ (9.9M) are 1.5 and 1.7, respectively. This small drop in initial reaction rate with the addition of the overlayer is one of the significant advantages of using a layered catalyst in a flow through membrane geometry. This modest inhibition of the rate of hydrogenation caused by the silica and germanium oxide overlayers relative to the totally exposed metal does not occur in conventional single sided layered catalysts. In the single sided non flow through layered catalyst illustrated in FIG. 1 and described by A. B. McEwen, W. F. Maier, R. H. Fleming, S. M. Baumann (Nature 329, 531-4 (1987)), the ratio of catalytic activity observed for the bare metal and silica protected geometry (Si/Pt Si/Pt/SiO$_2$) was about 100, two orders of magnitude smaller than in the flow-through cases. These flowthrough membrane experimental results therefore constitute strong evidence available for efficient activated hydrogen transport and utilization.

EXAMPLE 3

Three dimensional activated hydrogen transport is needed to construct a surface catalyzed membrane containing catalyst and transport layers. The mechanisms of activated hydrogen transport on and through solids are still unclear even though hydrogen spillover effects have been extensively studied in catalysis. Several mechanistic possibilities are: a) free hydrogen atom migration, b) additionelimination processes involving hydrogen atom reaction with defect sites, c) concerted processes with simultaneous bond breaking and making reactions throughout the solid, and d) oxidation-reduction pathways involving separate proton and electron transport.

Gas permeability experiments were conducted to provide further support for three dimensional activated hydrogen transport phenomena in surface catalyzed membranes containing a catalyst and transport layer. A pronounced directional anisotropy should exist for hydrogen flow through a membrane structure containing a catalyst layer that activates hydrogen and a layer that transports the activated hydrogen. Hydrogen brought from the catalyst side should move through the transport layer as an activated species. Hydrogen incident on a noncatalytic transport layer will tend to move through as a molecular species. This difference leads to a hydrogen flow anisotropy in a membrane containing a catalytic and transport layer. The anisotropy should not exist for rare gasses which cannot be catalytically activated.

To measure a directional flow anisotropy surface catalyzed membranes were prepared on a polymer support with a Pt catalyst layer and a silica like transport layer. The polymer support used in the permeability studies was a free standing 6.3 micron thick polypropylene film. Pt layers used in these experiments were prepared by sputtering and electron beam evaporation was used to coat "silica" layers used. Because hydrogen gas is impermeable to bulk Pt, the thickness of the Pt was limited to less than 250 Å. This is a Pt thickness similar to those used in Examples 1 and 2. At this thickness the deposited Pt film should be unconnected Pt islands with ~100 Å dimensions. Such a structure was observed with scanning tunneling microscopy when Pt was sputter deposited onto an electrically conducting graphite support. Similar film morphology would be expected on the nonconducting polypropylene films used in these experiments which cannot be investigated with scanning tunneling microscopy. For experiments probing three dimensional spillover, the Pt islands were overcoated with 50–2000 Å layers of electron beam evaporated silica. In this thickness range, the silica is expected to have a measurable density of pinholes or large pores. These pinholes or pores will tend to reduce the magnitude of any flow anisotropy through the membrane. Effects of the pinholes or pores in the silica can be minimized by choosing the thickness of the polymer support layer to provide a flow resistance comparable to that of the Pt and silica films. By having this flow resistance, pinholes in the silica film cannot act as a rapid diffusion path or "short circuit" and their effects on anisotropies in hydrogen gas permeability is minimized.

To minimize mechanical damage that can occur in gas permeation measurements, samples mounted in a gas permeation cell were mounted between sheets of porous teflon (Gortex) and supported with an electroformed grid ~250 micron holes). Gas flux through the thin film membranes was measured by setting a pressure differential of 100–500 Kpa across the membrane and following the pressure rise into a known volume. Repeating this procedure for several pressures and plotting these flows vs. initial pressure gives a slop that is proportional to the reciprocal of the flow resistance of the membrane.

Permeabilities were measured in the forward and reverse direction with respect to membrane geometry for helium, argon (inert, internal control gasses) and hydrogen. In a typical non-catalytic membrane, gas permeability is isotropic, flux is equal in both directions given constant pressure and area. For membranes with transport layers incorporated, a distinct flow anisotropy was observed in the forward and reverse direction. Results showing the flow anisotropy for one particular membrane are summarized in the table below.

| Experiment[a] | Gas Permeability (cc/(100 in$^2$-24 hrs-atm-mil)) | | | |
|---|---|---|---|---|
| | H$_2$ | Ar | H$_2$ | He |
| Forward Flow[b] gas → PP/Pt/SiO$_2$ | 2210 | 67 | 1710 | 121 |
| Reverse Flow[c] | 1190 | 84 | 893 | 109 |
| Permeability Ratio $P_{forward}/P_{reverse}$ | 1.9 | 0.7 | 1.9 | 1.1 |

[a]PP = polypropylene, 6.3 μm Pt = platinum, 235Å SiO$_2$ = silica 1658Å
[b]Gas flows from polymer side to silica side of membrane.
[c]Gas flows from silica side to polymer side of membrane.

For the PP/Pt/SiO$_2$ membrane (see FIG. 2 for general morphology), a factor of two increase in hydrogen permeability was observed for the case where hydrogen contacts the Pt thin film before the silica layer (Table II). In contrast the helium and argon permeabilities were the same in both directions and clearly demonstrate that the hydrogen is involved in an activated transport process.

What is claimed is:

1. A multilayered surface catalyzed membrane for reacting a reactant and a feed material to form a product comprising:
   (a) a semi-permeable non-microporous support membrane which transports a reactant incident from one side of said support membrane,
   (b) a thin-film first catalytic activating material adjacent to said non-microporous support membrane on the side away from said incident reactant, wherein said feed material is incident on said catalyst membrane from the side opposite said reactant,
   (c) a thin-film non-porous inorganic protective transport overlayer adjacent said first catalytic activating material.

2. The membrane of claim 1 further comprising a thin-film of a second catalytic activating material adjacent to said support member on the side opposite said first catalytic activating material.

3. The membrane of claim 2 wherein said protective layer is SiO$_2$.

4. The membrane of claim 1 wherein said first activating material includes platinum.

5. The membrane of claim 2 wherein said second activating material includes Ir or Rh or mixtures thereof.

6. The membrane of claim 1 wherein said support membrane is a polymer film.

7. The membrane of claim 6 wherein said polymer film is a polyimide film.

* * * * *